Patented July 1, 1930

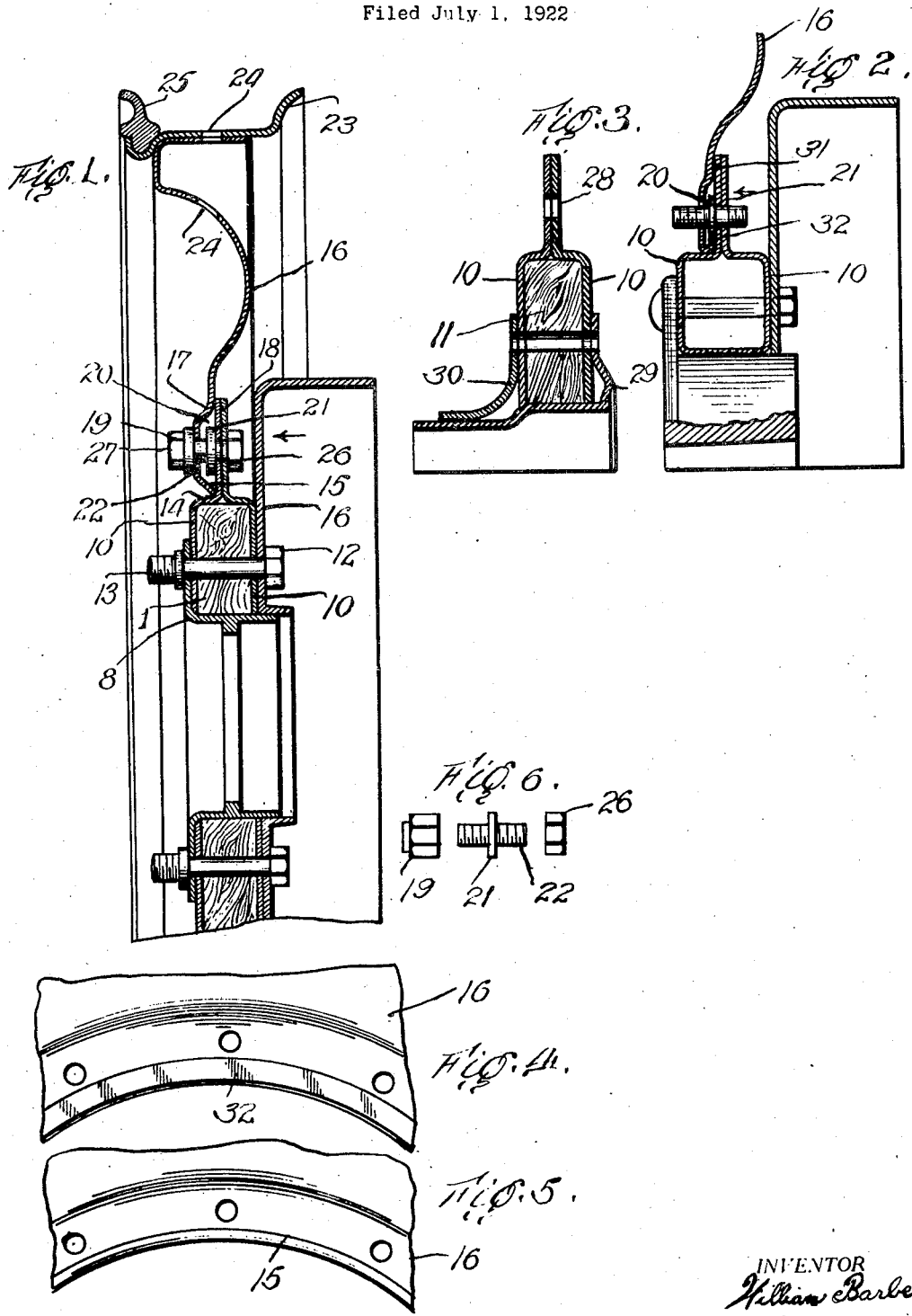

1,768,947

UNITED STATES PATENT OFFICE

WILLIAM BARBER, OF BROOKLYN, NEW YORK, ASSIGNOR, BY MESNE ASSIGNMENTS, TO STEEL WHEEL CORPORATION, OF LANSING, MICHIGAN, A CORPORATION OF MICHIGAN

METAL DISK WHEEL

Application filed July 1, 1922. Serial No. 572,262.

This invention relates to an automobile metal disk wheel.

The object of this invention is to provide means, whereby, a metal disk wheel may be mounted or dismounted from a hub of any standard construction.

A further object of this invention is to provide a demountable metal disk wheel structure, in which the wheel body is interchangeable from one automobile to another, without modifying the hub or any part thereof.

Other objects of this invention will appear more fully hereinafter.

This invention consists substantially in the construction, combination, location and relative arrangement of parts, all as will be more fully hereinafter set forth as shown in the accompanying drawing and finally pointed out in the appended claims.

In the accompanying drawing which forms a part of the specification and in which like characters of reference indicate the same or like parts, Fig. 1 is a sectional view of a wheel constructed in accordance with the principles of my invention.

Fig. 2 is a sectional view similar to Fig. 1 but showing a slightly different construction.

Fig. 3 is a sectional view of a wheel structure without a brake drum.

Fig. 4 is a plan view of a portion of the disk indicated by the arrow in Fig. 2.

Fig. 5 is a plan view of a portion of the disk indicated by the arrow in Fig. 1.

Fig. 6 is a view of the bolt and its nuts.

The same part is designated by the same reference numeral wherever it occurs throughout the several views.

Referring now to the drawings, the hub flange 8 is of standard construction and the inner portion thereof is supplied with a standard brake drum 9. Two annular spacer members 10, 10 are also fitted on the hub sleeve, and between these members there is provided a clearance in which is seated the annular or spacer ring 11. This ring and the spacer members 10, 10 are held in assembled position with the brake drum 9 by bolts 13 and holding nuts 12 suitably distributed to thus form a complete hub unit, constituting in effect an extension of the hub flange, which carries the disk 16 of the wheel. The spacer members 10, 10 are provided with a flange 18 and shoulders 14. The shoulder 14 of the outer spacer member or hub flange extension and the tapered inner periphery 15 of the disk body 16 are in contact and the annular depression 17 of the disk body rests on the flange 18 of the outer spacer member, and the flanges 18 of both spacer members support and carry the wheel disk 16. These flanges are provided with a number of bores 28 properly spaced to receive tie bolts 27. Each tie bolt is provided with a shoulder 21 which seats against the outer face flange 18 when the seating nut 26 is applied. The other end of bolt 27 projects outwardly through the offset annulus 22 of the disk body 16. Nuts 19 provide means for drawing this annular offset portion of the disk body up towards the bolt shoulder 21 to thus securely seat the depressed portions 15 and 17 on the spacer flange 18, measurably expanding the annulus to prevent the nuts from getting loose and to seat the inner periphery 15 of the disk upon the shoulder 14 of the hub flange extension 10.

The outer periphery of the disk body 16 is shaped to receive a tire rim 23. The rim and the disk body are provided with valve receiving holes 24. A tire locking ring 25 is provided to hold the tire as is well known to the art.

It will be noted that the spacer members 10, 10, the spacer ring 11 and the holding bolts 27, and the lock nuts form an assembly unit which is applicable to a standard hub, and this unit can be applied to such a hub without modifying any part thereof. In Fig. 3 I have shown such an assembly on a hub 29 having a flange member 30.

In Fig. 2 I have shown my universal hub assembly unit just described, as being fitted with a wheel body 16 which fitting is similar to that of Fig. 1 except that the inner or seating periphery is turned under completely. In this construction the inner edge is bent over so as to be folded and reinforced at 32. This edge, with the depression 31 engages the seating flange 18 as in the former case. It will be noted that the infolded lip 32 of Fig. 2 or the edge 15 of Fig. 1 of the wheel body fits in the shoulder 14 of the outer spacer member 10 and firmly seats the disk body 16 on the flange of said spacer member when the nuts 19 are applied. This construction affords a very strong and reliable union between the body of the wheel and my universal hub assembly unit.

Having now set forth the objects and nature of my invention, and constructions embodying the principles thereof, what I claim as new and useful and of my own invention and desire to secure by Letters Patent is:

1. In a disk wheel structure, a wheel body having an offset near its inner periphery and a strengthening lip at the periphery, a hub assembly unit having a flange extension and shoulder on which the offset and lip, respectively, rest, and means to unite said wheel body and assembly unit to lock the same together.

2. In a disk wheel structure, a wheel body having an offset near its inner periphery and an enlarged lip at the periphery, a hub assembly unit having a flange extension and shoulder on which the offset and lip, respectively, rest, and bolts having shoulders against which said lip rests when said assembly and wheel body are united.

3. In a wheel assembly, the combination with a hub, and a hub flange, of a wheel comprising a rim, a concentrically arranged annulus and a wheel body extending from the rim to its annulus, the hub flange provided with a radially facing seat adapted to receive and radially support the annulus, and clamping-means for expanding the annulus and holding the same firmly upon its seat against radial or lateral displacement.

4. In a wheel assembly, the combination with a hub, and a hub flange, of a wheel comprising a rim, a concentrically arranged rearwardly opening annulus and a wheel body extending from the rim to its annulus, the hub flange provided with a radially facing seat adapted to receive the annulus with its edge bearing against the face of the flange, and clamping means for holding the annulus firmly upon its seat and against the flange surface.

Signed at Brooklyn, in the county of Kings and State of New York, this 29th day of June, A. D. 1922.

WILLIAM BARBER.